United States Patent [19]

Mori et al.

[11] Patent Number: 5,141,638
[45] Date of Patent: Aug. 25, 1992

[54] BEER FILTRATING APPARATUS

[75] Inventors: Junichiro Mori; Naoki Inoue; Yuuichiro Sakai; Yoshiyuki Kitamura; Noboru Hibi, all of Tokyo; Masamitsu Mizuki; Atsushi Yoshida, both of Osaka, all of Japan

[73] Assignee: Kirin Beer Kabushiki Kaisha, Tokyo, Japan

[21] Appl. No.: 701,191

[22] Filed: May 16, 1991

[30] Foreign Application Priority Data

May 18, 1990 [JP] Japan ................................ 2-128398

[51] Int. Cl.⁵ ............................................ B01D 39/20
[52] U.S. Cl. ............................... 210/257.1; 210/323.2; 210/335; 210/340; 210/509; 210/510.1
[58] Field of Search .................. 210/321.9, 252, 257.1, 210/251, 323.1, 323.2, 340, 341, 500.25, 509, 510.1, 335

[56] References Cited

U.S. PATENT DOCUMENTS 4,062,771 12/1977 Saupe ............................ 210/321.9

Primary Examiner—Frank Sever
Attorney, Agent, or Firm—Ladas & Parry

[57] ABSTRACT

A filtrating apparatus is disclosed in which a filter unit and a washing unit for effecting a fluid washing are unified into one system. A plurality of filter elements of main filters provided in the filter unit are made of sintered material containing metallic fiber. A nominal filtration rating of the filter elements is greater than 0.3 μm but smaller than 2 μm. Accordingly, it is possible to ensure the smooth filtration of beer funguses without any necessity of interchanging filter elements. It is therefore possible to reduce a running cost and filtration cost and to save a space for the apparatus.

11 Claims, 3 Drawing Sheets

1

BEER FILTRATING APPARATUS

BACKGROUND OF THE INVENTION

The present invention relates to a filtrating apparatus for normally, continuously filtrating foreign matters such as yeast funguses which are contained in beer during a beer producing process. It relates more particularly to a filtrating apparatus which is capable of recycling a filter in an in-line manner.

Recently, in the beer producing process, it is necessary to filtrate the beer, which has been subjected to a so-called post-fermentation, to remove funguses from the beer. In this case, after a preprocess filtration using a filter aid such as diatomaceous earth and the like has been effected, a finishing filtration is further effected. At this time, it is generally well known to use a resin (or synthetic resin) made cartridge filter as a filter medium for a direct filtration.

However, since the resin made cartridge filter has a low mechanical strength, there is a fear that the filter would be damaged if the flow rate and pressure conditions would be worse. Also, it would be impossible to effect a strong physical washing such as flashing.

In view of the characteristics of the material and the structure, there is a fear of a damage of the filter or a fear of residual chemicals, and hence, a chemical washing using chemicals is not normally performed. In general, the filtration resistance would be large so that a desired filtrated flow rate per one unit area could not be attained. In view of a damage at a high temperature, it would be impossible to sterilize the apparatus having the filter with steam kept at about 120° C. or more.

Accordingly, in general, it is difficult to recycle or regenerate the resin made cartridge filter. Such a filter is used as a disposable one. It is thus necessary to effect an interchanging work which could not be attained in an automatical manner. At the same time, since the running cost would be increased, it is desired to develop beer filters instead of the conventional filters. Also, as described before, it is impossible to increase the filtration flow rate per one unit area in such a resin made cartridge filter. In order to increase the amount of processed beer, it is necessary to increase a filteration area, which will lead to an enlargement of the apparatus per se. On the other hand, in a method using the assistant chemicals, it is necessary to provide an extra equipment relative to the assistant chemical process. In this case, the apparatus would be enlarged in size and it would be impossible to make the apparatus compact.

SUMMARY OF THE INVENTION

In view of the foregoing difficulties, an object of the present invention is to provide a filtrating apparatus provided with a filter element which has the following advantages: i) reliable filtration of the beer; ii) possibility of washing by using assistant chemicals; iii) a large mechanical strength; and iv) repeatedly usable or regeneration, in which a filtration step and a recycle step are incorporated into a single system to form an in-line recycle system to thereby considerably reduce the filtration cost and to make the filtration apparatus itself compact.

In order to attain the foregoing and other objects, according to the invention, there is provided a beer filtrating apparatus comprising a sintered filter element containing at least metallic fiber; a main filter for filtrating beer; a subfilter for filtrating a washing fluid fed to the main filter; and a buffer tank connected to the main filter for temporarily reserving a predetermined amount of fluid in order to recycle clogging of the main filter, wherein the filter element provided in the main filter and containing the metallic fiber has a nominal filtration rating greater than 0.3 but smaller than 2.0 $\mu$m.

In the beer filtrating apparatus according to the invention, the filter element provided in the main filter contains metallic fiber and the nominal filtration rating of the filter element containing the metallic fiber is in the range greater than 0.3 but smaller than 2.0 $\mu$m, to thereby enable the beer filtration, to extremely facilitate and ensure the filter recycle in an in-line manner, and to enable the economical running operation of the apparatus to considerably reduce the cost and the space.

DESCRIPTION OF THE PREFERRED EMBODIMENTS

A beer filtrating apparatus according to the invention will now be described in more detail with reference to the accompanying drawings. In this apparatus, a fungus removing filtration for beer yeast funguses is effected during a beer producing process.

Figure 1:
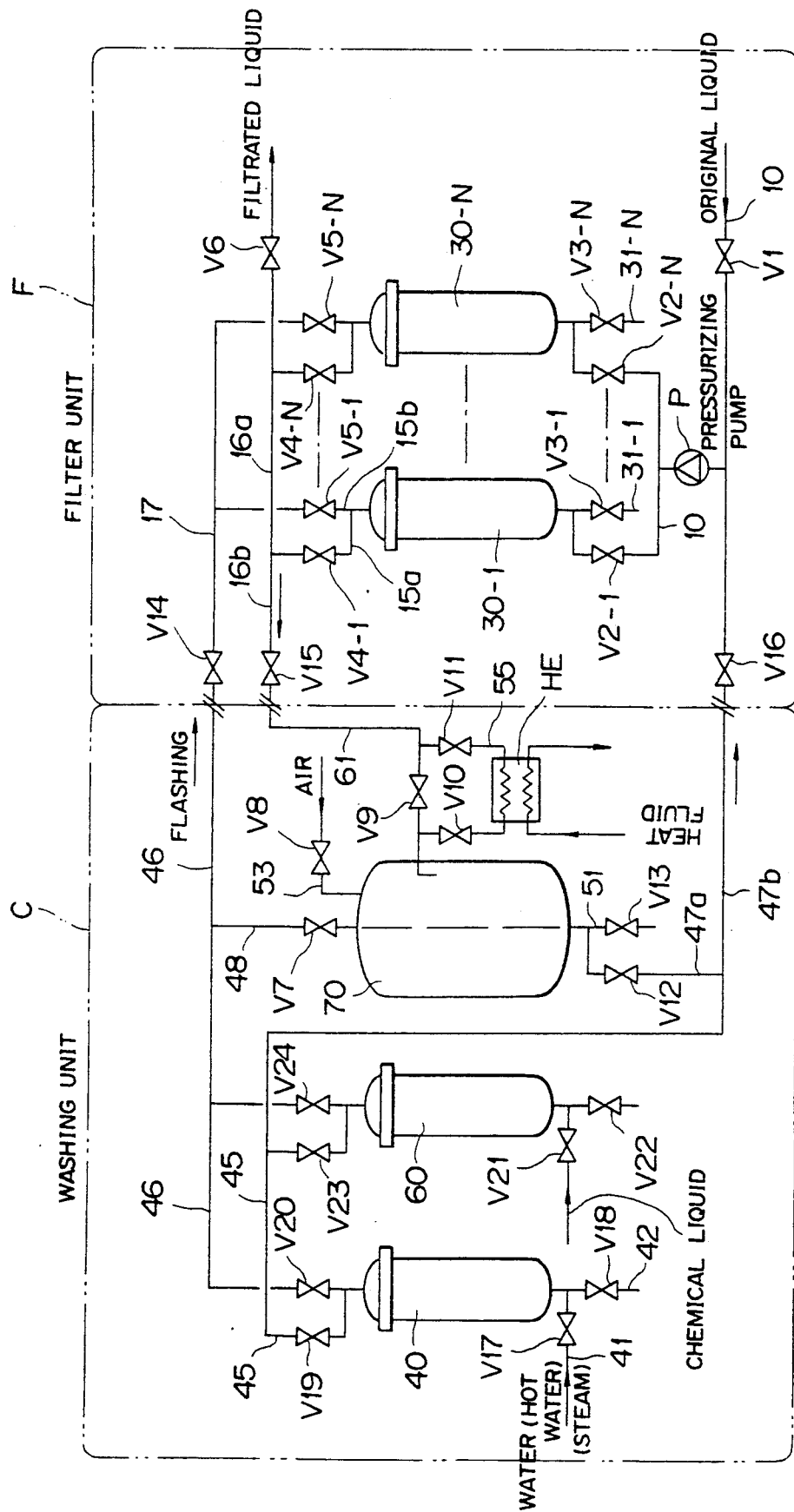
FIG. 1 is a schematic view showing a flow path of a beer filtrating apparatus according to the invention.

As shown in FIG. 1, the filtrating apparatus according to the invention is roughly separated into a filter unit F within a right area surrounded by a two-dot chain line for the sake of explanation and a washing unit C within a left area surrounded by a two-dot chain line. In this embodiment, the filter unit F roughly has a role in filtration of beer yeast funguses after post-fermentation. More specifically, an original liquid flow introducing pipe 10 is provided with a valve V1 and a pressurizing pump P as shown on the rightward lower side of FIG. 1. The pipe is branched upon the passage of the pressurizing pump P into N branches corresponding to a number of main filters 30-1 through 30-N to be described later. The branched pipes are connected to first connection ports on one side (on a lower side) of the main filters 30-1 through 30-N, respectively. Prior to the connection, valves V2-1 through V2-N are provided, respectively. Further, drain pipes 31-1 to 31-N and valves V3-1 to V3-N are provided on the first connection port side, respectively.

Figure 2:
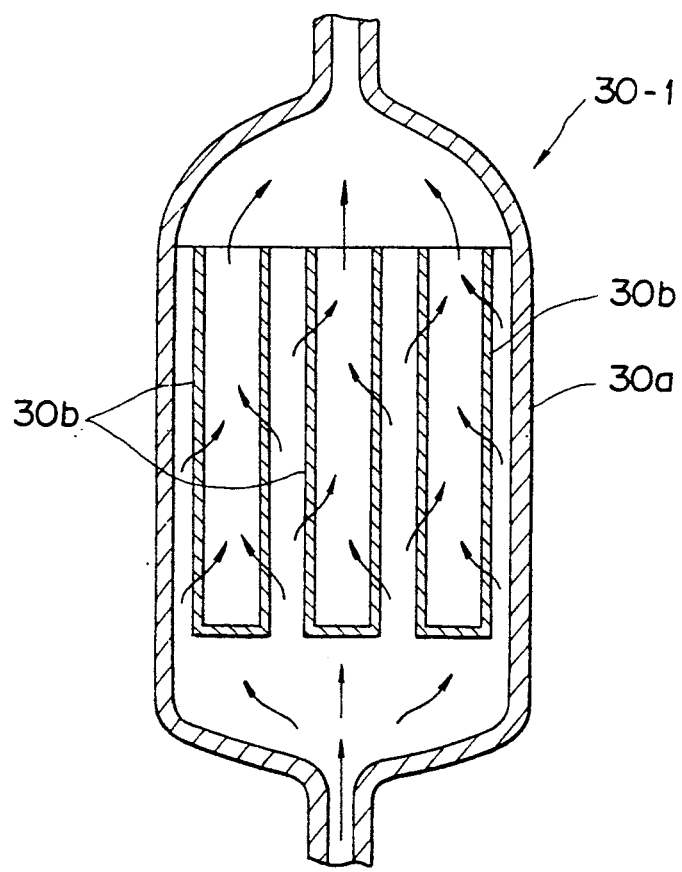
FIG. 2 is a cross-sectional view showing a main filter used in the apparatus according to the invention.

The main filter 30-1 has a cylindrical housing 30a and a plurality of filter elements 30b disposed within the housing 30a as shown in FIG. 2. The filter elements 30b are made of sintered filter material.

The filter element is made of sintered material containing at least metallic fiber. A nominal filtration rating of the filter element containing the metallic fiber is in the range greater than 0.3 $\mu$m but smaller than 2.0 $\mu$m, more preferably in the range not smaller than 0.6 $\mu$m but not greater than 1.5 $\mu$m. If this value be equal to or greater than 2.0 $\mu$m, it would be impossible to collect the beer funguses, so that a so-called fungus removing effect would be reduced. On the other hand, if the value is equal to or smaller than 0.3 $\mu$m, the filter element would be clogged, so that it would be impossible to effect a so-called reverse washing and it would be impossible to recycle the filter element. The "nominal filtration rating" means herein a particle diameter ($\mu$m) exhibiting a collection efficiency of 95% in a collection efficiency curve in the case where experimental powder is used as a contaminant.

The above-described metallic fiber has a diameter of 50 $\mu$m or less over a predetermined length in the longitudinal direction. The fiber means a long fiber obtained by cutting metallic fibrous tow into silve form or a short fiber obtained by applying a crystal grain adjusting treatment to the tow and by cutting the tow by the granular corrosion in an acid solution so as to have an aspect ratio (length/diameter) of about 3 to 50. The diameter of the metallic fiber is in the range of 2 to 20 $\mu$m, more preferably, in the range of 4 to 12 $\mu$m, and most preferably in the range of 4 to 8 $\mu$m. The aspect ratio of the metallic fiber used in the invention is in the range of 3 to 50, more preferably in the range of 3 to 20, and most preferably in the range of 5 to 10. If the diameter and the aspect ratio would exceed the upper limits, the void rate of the filter element would be reduced and the short fiber itself would be likely to be entangled, so that the porosity rate would be non-uniform and the width of the pore diameter distribution would be increased, disadvantageously. Inversely, if the diameter and the aspect ratio would exceed the lower limits, the mechanical strength would be inferior and granulated, so that it would be impossible to obtain a sintered element having stable fine voids, disadvantageously.

The material for such a fiber is selected from the group essentialy consisting of materials, which is superior in thermal resistance and corrosion resistance, such as stainless steel, inconel, and hastelloy.

The metallic fiber is sintered into the filter element independently or in a mixed manner with metallic fine powder made of the same material as the fiber or different material from the fiber, for example, atomized powder, in accordance with a specific use. In particular, the sintered element made of mixed material of the metallic short fiber and the metallic atomized powder has an advantage such that it is possible to suppress the pressure loss to a decreased level while keeping a void diameter at a high level. Also for the use in which a large filtration pressure is applied to the filter surface, it is particularly preferable to use the sintered material of the metallic long fiber. In this case, it is possible to obtain substantially the same effect with the mixture of the long fiber and the short fiber.

It should be noted that as the metallic fine powder, the atomized powder of stainless steel powder having a diameter of 10 to 100 $\mu$m, more preferably 10 to 80 $\mu$m, and most preferably 20 to 70 $\mu$m is used. The mixture ratio between the above-described metallic fiber and the metallic fine powder is 4:1 to 1:4, and more preferably, 7:3 to 3:7.

Such a filter element containing the metallic fiber and the like is produced in a variety of conventional methods such as a sintering method. The porosity rate of the sintered filter element is in the range of 30 to 55%, more preferably in the range of 45 to 50%, and most preferably in the range of 48 to 50%. If this value would be not greater than 30%, there would be disadvantages that the pressure loss would be increased and the service life of the filter element would be shortened. If this value would exceed 55%, there would be disadvantages that the mechanical strength of the filter element would be reduced and the width of the void diameter distribution would be increased.

Since the filter element containing the metallic fiber and the like has a sufficient mechanical strength, it is unnecessary to increase a thickness of the element and the pressure loss of the fluid passage may be suppressed. The thickness thereof is in the range of 1 to 3 mm, more preferably at approximately 2 mm. The region (or width) of the void diameter distribution of the filter element used in the present invention is narrow with a uniform void diameter.

As shown in FIG. 2, such a filter element is formed into a bottomed cylindrical shape. Normally, a plurality of filter elements are uniformly arranged within the housing. For example, the single or the plurality (three or seven) of cylindrical filter elements each having a size of 70 mm (indiameter)×750 mm (length) are disposed within the housing.

By using such a filter element, it is possible to ensure the fungus removing filtration of the beer yeast funguses, and it is also possible to reuse or recycle the filter element. It is also possible to effect a reuse using chemicals and to effect sterilization. It is to be noted that the shape of the filter element is not limited to the cylindrical shape as shown in FIG. 2. It is therefore possible to take a disk shape for the filter element, for example, to ensure substantially the same effect.

By the way, it should be noted that, generally, the other main filters 30-2 through 30-N may be manufactured in the same way as in the filter 30-1.

Each pipe provided at the other end of the main filter 30-1 on the second connection port side (i.e., the upper side) is branched into a first pipe 15a and a second pipe 15b, and the first pipe 15a is further branched into a third pipe 16a and a fourth pipe 16b. The first pipe 15a and the second pipe 15b are provided with valves V4-1 and V5-1, respectively. The third pipe 16a and the fourth pipe 16b are provided with valves V6 and V15. The second pipe 15b is connected to the main pipe 17 which is connected to the washing unit C side to be described later and as shown in FIG. 1.

The fourth pipe 16b is connected to a pipe 61 on the washing unit C side and is further connected to a buffer tank 70 through valves V15 and V9.

With respect to the other main filters 30-2 to 30-N, these filters are also arranged in parallel as shown in FIG. 1 in the same way as the main filter 30-1. The number of the main filter is N for the sake of explanation, but the number is not limited to N.

In the embodiment shown, the washing unit C is provided with a utility filter 40 and a chemical filter 60 as subfilters on the left side in FIG. 1. The unit C has the buffer tank 70 on the right side in FIG. 1. The nominal filtration rating of the subfilters must be the same extent as that of the main filters. The filter elements of the subfilters may be resin made cartridge filters or sintered filter elements containing the metallic fiber. The basic structures of the utility filter 40 and the chemical filter 60 are the same as those of the main filters 30-1 through 30-N. A fluid introducing pipe 41 for introducing water, hot water, steam and the like for washing and a drain pipe 42 are provided at one end of the utility filter 40, i.e., the first connection port side (i.e., the lower side). A branched first pipe 45 and a second pipe 46 are provided at the other end of the utility filter 40, i.e., the second connection port side (i.e., the upper side). The first pipe 45 is further branched into a third pipe 47a and a fourth pipe 47b, and the second pipe 46 is connected to the buffer tank 70 through a branched pipe 48 as shown. The third pipe 47a is connected to the lower portion of the buffer tank 70. The fourth pipe 47b is connected to the original liquid introducing pipe 10 of the above-described filter unit F.

The fluid introducing pipe 41 and the drain pipe 42 are provided with a valve V17 and a valve V18, respectively. The first pipe 45 and the second pipe 46 in the vicinity of the upper portion of the utility filter 40 are provided with a valve V19 and a valve V20, respectively. A parallel piping is effected in the chemical filter 60 in the same manner as the utility filter 40. Chemicals and the like are mainly introduced into the chemical filter 60.

The buffer tank 70 is used for the steps of water or hot water washing, flashing, chemical washing and the like. The third pipe 47a and the pipe 48 at the lower portion and upper portion of the tank 70 are provided with a valve V12 and a valve V7, respectively. A drain pipe 51 provided through a valve V13 at the lower portion of the tank 70. An air introducing pipe 53 is provided through a valve V8 at the upper portion of the tank 70. A pipe 61 is provided through a valve V9 at a barrel portion of the tank 70. A pair of bypass pipes 55 are provided so as to embrace the valve V9 in the pipe 61 through valves V10 and V11. A heat exchanger HE is arranged in a part of the bypass pipe 55 for heat exchange as occasion demands.

The pipe 61 is in fluid communication with the pipes 16a and 16b of the filter unit F through the valve V15.

An operation of the filtration apparatus will be explained.

(1) Filtration Process Using Filter Unit F (Step for Passing Beer Through Main Filters)

i) By closing the valves V14, V15 and V16, the filter unit F and the washing unit C are interrupted.

ii) By opening the valves V2-1 to V2-N and the valves V4-1 through V4-N and operating the pressurizing pump P, the beer original liquid is introduced into the apparatus. The liquid is passed through the main filters and thereafter is discharged from the system as filtrated liquid. By opening/closing the valve V1 and the valve V6 as desired, it is possible to perform an intermittent operation. Furthermore, it is sufficient to perform the flow control as occasion demands.

(2) Washing Process-1

The washing process is used to reuse or refresh the clogging of the main filters by water or hot water washing, flashing and chemical-washing.

1) First of all, the valves V1 and V6 are closed, and the valves V15 and V16 are opened.

2) Subsequently, the water or hot water washing is effected in the following order.
  i) The valves V17 and V19, the valves V2-1 to V2-N, and the valves V4-1 to V4-N are opened, and the valves V9 and V13 are opened to form a discharge line.
  ii) The washing is effected by feeding water or hot water and operating the pressurizing pump while discharging the washing water to the outside of the system.
  iii) Each part of the pipings are blow-washed.

3) Flashing is effected. The order of the flashing is as follows (but the order of the steps 2) and 3) may be reversed as desired).

i) The valves V17, V19 and V12 are opened to feed a predetermined amount of water in the buffer tank 70, and the valve V12 is closed. Thereafter, the valve V8 is opened to feed air up to a predetermined pressure (In some cases, only air is fed).

ii) After closing the valve V8, the valves V7, V14, V3-i and V5-i (where i is representative of any number selected from 1 to N) are opened to perform flashing.

iii) The step ii) is repeated from i=1 to i=N (repeating a suitable set number).

iv) After the steps i) to iii), water and air are fed in accordance with the step i), and the valve V12 is closed. Thereafter, the valves V7, V22 and V24 are opened to perform the flashing of the chemical filter (repeating a suitable set number).

v) The water and air are fed in accordance with the step i), and the valve V12 is closed. Thereafter, the valves V7, V18 and v20 are opened to perform the flashing of the utility filter (repeating a suitable set number). According to the embodiment, the chemical filter and the utility filter are reused. However, these filters may be of the disposal type such as the resin made cartridge filter to omit the flashing operation.

4) The chemical liquid washing is performed in the following order as desired every periodic time or the clogging problem.

i) The valves V21, V23 and V12 are opened to feed chemical liquid in the buffer tank 70.

ii) After closing the valves V21 and V23, the valves V17 and V19 are opened to feed the water or hot water to a suitable level to dilute the chemical liquid.

iii) The valves V17 and V19 are closed, the valves V16, V2-1 to V2-N, V4-1 to V4-N and V15 are opened. If the temperature should be kept at a high level, the valves V10 and V11 are opened, and except for this, the valve V9 is opened.

iv) The pressurizing pump P is operated to thereby operate the buffer tank as a buffer to effect circulation for a predetermined period of time.

v) After the circulation, the pressurizing pump P is stopped, and the overall blow is effected, or the valve V12 is closed and the valves V17, V19 and V13 are opened to perform the extrusion washing with water or hot water.

vi) The foregoing steps are performed with a combination of predetermined kinds of chemical liquids having predetermined concentrations. The examples for this are shown below:
 0.5 to 5%, NaOH, 60° to 95° C., 30 minutes
 0.5 to 3%, HNO$_3$, a room temperature to 85° C., 30 minutes (3) Washing Process-2

This step is performed for sterilizing funguses with hot water, chemicals and steam.

1) The sterilization with hot water is effected. This step corresponds to the case of the step (2)-4) but no chemicals are used (For example, 80° to 95° C., 30 minutes, only with hot water).

2) The chemical sterilization is effected (NaC10 or the like). The step corresponds to the case of (2)-4) but the sterilizer is used as a chemical liquid (for example, 20 to 50 ppm, NaC10, a room temperature, 30 minutes). The circulation or the stagnation is effected if necessary.

3) The sterilization with steam is effected.

The operation of the filtration apparatus shown in (filter element samples 1–5). The filter area of the test pieces was 10 cm², respectively.

TABLE 1

| Sample No. | Nominal Filtration Rating (μm) | Metallic Fiber Diameter (μm) | Aspect Ratio | Metallic Powder Grain Size | Mixture Ratio Metallic Fiber Metallic Powder | Porosity Rate (%) | Filter Element Thickness (mm) |
|---|---|---|---|---|---|---|---|
| 1 | 0.3 | 8 | 5–10 | 20 μm or less | 7:3 | 40 | 2 |
| 2 | 0.6 | 8 | 5–10 | " | 1:2 | 47 | 2 |
| 3 | 1.0 | 8 | 5–10 | 75 μm or less | 2:3 | 48 | 2 |
| 4 | 1.5 | 8 | 5–10 | " | 1:2 | 48 | 2 |
| 5 | 2.0 | 8 | 5–10 | " | 1:2 | 51 | 2 |

FIG. 1 has been described above.

Figure 3:
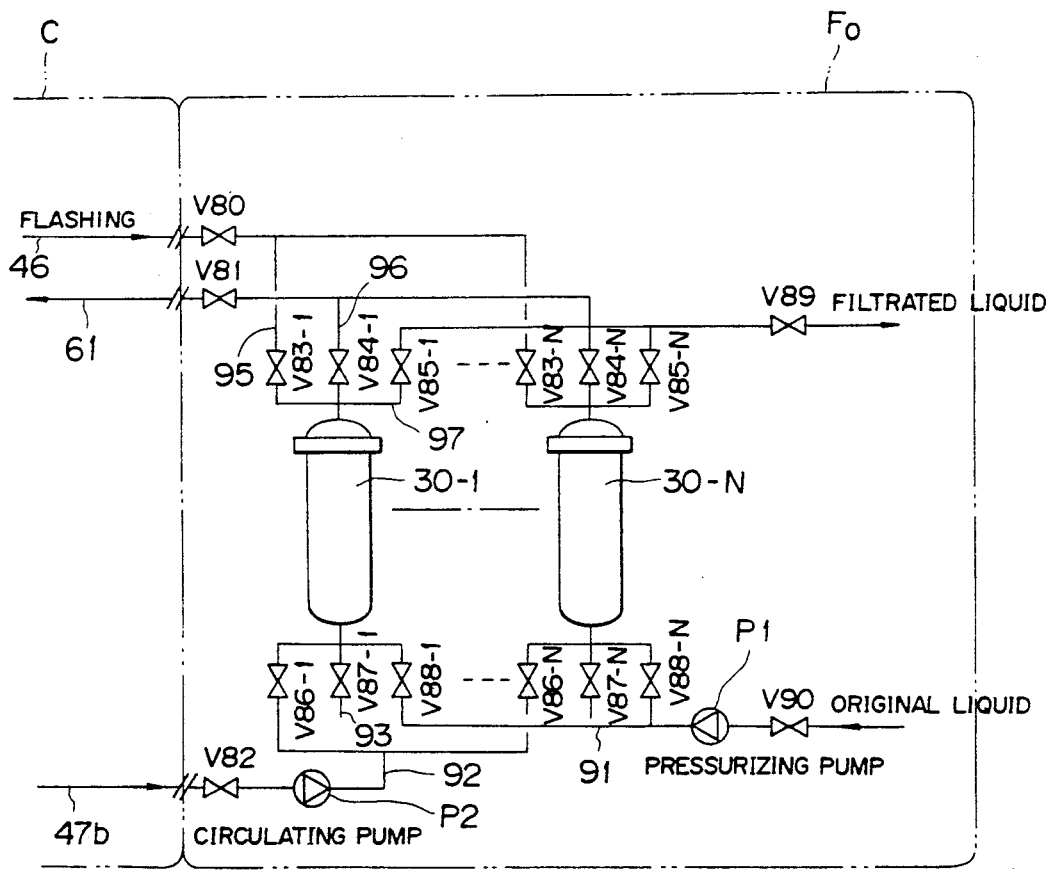
FIG. 3 is a schematic view showing a flow path of a beer filtrating apparatus according to another embodiment of the invention.

By the way, the filter unit F of the filtration apparatus may be replaced by a filter unit $F_0$ having another structure as shown in FIG. 3. Namely, as shown in FIG. 3, the filtration apparatus has a plurality (N in the case of the embodiment) main filters 30-1 to 30-N in parallel with the pipe system.

Among these filters, the main filter 30-1 will be particularly explained as follows. An original liquid introducing pipe 91 provided with a pressurizing pump P1 for introducing beer original liquid, a washing pipe 92 provided with a circulating pump and connected to a washing unit, and a drain pipe 93 are branched from a first connection port (lower side) at one end of the main filter 30-1. As shown in FIG. 3, the original liquid introducing pipe 91 is provided with valves V90 and V88-1, the washing pipe 92 is provided with valves V82 and V86-1, and the drain pipe 93 is provided with a valve V87-1. Three pipes, i.e., a first pipe 95, a second pipe 96 and a third pipe 97 are branched from a second connection port (upper side) at the other end of the main filter 30-1. These pipes are provided with valves V83-1, V84-1 and V85-1 in the vicinity of the filter 30-1.

The pipe 95 is connected to the pipe 46 (FIG. 1) on the washing unit through a valve V80, the pipe 96 is connected to the pipe 61 (FIG. 1) on the washing unit side through a valve V81, and the pipe 97 is connected to the filtered liquid pipe through a valve V89.

The pipes are arranged in parallel in the same way with respect to the other main filters 30-2 to 30-N as shown in FIG. 3. Thus, the filtration operation and the washing operation of the filters may be carried out at the same time. The operational steps are as follows.

1) The valves V85-X and V88-X are opened for the main filters to perform the filtration (basically simultaneously using the number of the main filters N-1), and the valves V89 and V90 are opened. Under this condition, the pressurizing pump P1 is operated.

2) In the case of the filtration 1) simultaneously with the washing, the valves V85-i and V88-i are closed for a predetermined main filter (No. i), the valves V83-i, V84-i and V86-i are opened, and the valves V80, V81 and V82 are opened and closed in a desired manner, to perform the steps (2) and (3) described above.

The following specific experimental examples are shown in order to ensure the effect of the invention.

EXAMPLE 1

(Nominal filtration rating and beer filtration performance test)

Five kinds of test pieces of filter elements with the nominal filtration rating of 0.3μm, 0.6μm, 1.0μm, 1.5μm and 2.0μm were produced as shown in Table 1 below These filter element samples Nos. 1 to 5 were installed in a small-sized experimental apparatus, and the fungus removing or sterilization tests and in-line recycle property tests were repeatedly conducted.

The fungus removing ability was measured by measuring the concentration of the fungus contained in the processed beer liquid passed through the filter element samples. The concentration of the fungus contained in the beer liquid before filtration was $5 \times 10^4$ cells/ml. It was confirmed whether the filter elements could be recyclably used by the reverse washing (the flashing) with respect to the in-line recycle property.

The experimental results are shown in Table 2 below:

TABLE 2

| | Fugus Removing Property | | | |
|---|---|---|---|---|
| Sample No. | Concentration of Beer Fungus Type A Before Filtration (cells/ml) | Concentration After Filtration (cells/100 ml) | In-line Recycle Property | Total Evaluation |
| 1 | $5 \times 10^4$ | Not detected | Difficult | Not Good |
| 2 | " | Not detected | Acceptable | Good |
| 3 | " | Not detected | Acceptable | Good |
| 4 | " | Not detected | Acceptable | Good |
| 5 | " | $1 \times 10^2$ | Acceptable | Not Good |

The following fact is understood from the results of Table 2. Namely, in the filter element having the nominal filtration rating of 0.3μm, its fungus removing ability is excellent but it is difficult to perform the in-line recycle property. Also, in the filter element having the nominal filtration rating of 2.0μm, its in-line recycle property is excellent but its fungus removing ability is insufficient so that the beer fungus is detected in the filtrated beer liquid. In the filter element having the nominal filtration rating of 0.6 to 1.5μm, both the fungus removing ability and the in-line recycle property are extremely excellent.

EXAMPLE 2

Beer Fungus Filtration Test

Three kinds of beer fungus liquid filtration tests were conducted by using the test piece (having the filter area of 10 cm²) of the filter element sample No. 3 (nominal filtration rating of 1.0μm) listed in Table 1. The results are shown in Table 3 continued.

TABLE 3

| | | Fungus Concentration | |
|---|---|---|---|
| No. | Kind of Fungus | Before Filter (cells/ml) | After Filter (in 100 ml) |
| 1 | Beer Fungus Type A | $3.1 \times 10^4$ | Not detected |

TABLE 3-continued

| No. | Kind of Fungus | Fungus Concentration | |
|---|---|---|---|
| | | Before Filter (cells/ml) | After Filter (in 100 ml) |
| 2 | Beer Fungus Type B | $4.2 \times 10^4$ | Not detected |
| 3 | Beer Fungus Type B | $5.0 \times 10^4$ | Not detected |
| 4 | Beer Fungus Type C | $1.3 \times 10^5$ | Not detected |

It is confirmed from the results that the filter elements have a sufficient fungus removing ability for a variety of beer fungus.

EXAMPLE 3

Beer Fungus Filtration Test

The filter element samples No. 3 which were the same as those used in the foregoing tests were made in the form of cylindrical form as shown in FIG. 2 (with the rated filtration precision of 1.0 μm). Seven samples were installed in the housing to form a main filter (having a filter area of 1 m²). The beer containing beer fungus was flowed under the condition very similar to the actual filtration condition by using the apparatus shown in FIG. 1, and the fungus concentrations of the original liquid and the filtrated liquid were measured. Also, in order to know the relative ability of the filter, the beer was flowed through a cartridge filter (having a nominal filtration rating of 1.2 μm) made of polypropylene and recently used for the fungus removing filtration under the same condition. Then, the comparison was made. The results are shown in Table 4 continued:

TABLE 4

| | Number of Detected Funguses (sells/l) (Number of Detections) | | |
|---|---|---|---|
| | | Filtrated Liquid | |
| Test No. | Original Liquid | Metallic Fiber Sintered Filter | Cartridge Filter |
| 1 | 56 on Average | Not detected (in seven tests) | Not detected (in seven tests) |
| 2 | 230 on Average | Not detected (in seven tests) | Not detected (in seven tests) |
| 3 | 1,100 on Average | 11 (one test) Not detected (six tests) | 11 (one test) Not detected (six tests) |

Experimental Condition: Each test was continuously conducted for four hours through filtration for beer fungus (same as the beer fungus type C in Table 3) having a constant concentration.

Each test was conducted through continuous sampling (2 liters × 7 times).

From the results, it is confirmed that the apparatus according to the invention has the same beer removing ability as that of a conventional cartridge filter under the actual operational condition.

EXAMPLE 4

Test of Recycle Property of Beer Fungus Filtration

The beer fungus filtration and repeated recycle test were conducted by using the filtration apparatus shown in FIG. 1 according to the invention. Also, the results thereof were compared with the results of the above-described cartridge filter made of resin.

As a result, in the case of the filtration apparatus according to the invention, the flashing and the alkaline washing (2% NaOH) were effected after the filtration through 940 kl/m² (flashing every about 67 kl/m²), the filtration differential pressure was increased initially from 1.0 kg/cm² to 1.6 kg/cm² but this was recovered up to 1.2 kg/cm². In contrast, in the case of the resin made cartridge filter, there was almost no recovery through the washing.

Also, since the filter element according to the invention, may be recyclably used through the washing, it is possible use the filter unit for a long period of time with the filter elements being mounted in the filter unit. The more detailed numerical comparison was made between the filter according to the invention and the conventional resin made cartridge filter. The filter specifications and the results of the filter service life are shown in Table 5.

TABLE 5

| Filter Line Structure | Two-Stage Filter | | One-Stage Filter |
|---|---|---|---|
| | Prefilter | Final Filter | |
| Filtration Rating | 3.5 μm (nominal) | 1.2 μm (nominal) | 1.0 μm (nominal) |
| Filter Area (m²) | 127 to 253 | 127 to 253 | 4.26 |
| Filtration Rate (kl/hr · m²) | 0.16 to 0.32 | 0.16 to 0.32 | 9.4 |
| Service Life of Filter (kl/m²) | 11.9 to 47.2 | 11.9 to 47.2 | 6,030 or more |

In order to prolong the filter service life as much as possible, the resin made cartridge filter was of the two-filtration system in which the prefilter and the final filter were connected in series. The recycle step of flashing (reverse washing) was effected to the filter according to the present invention, whereas the resin made cartridge filter was orderly (or not reversely) washed by using hot water.

According to the results shown in Table 5, the filter service life per unit area of the resin made cartridge filter was 11.9 to 47.2 kl/m², whereas the service life according to the invention was still usable as a filter even exceeding 6,030 kl/m².

It is apparent for those skilled in the art that, although the invention has been explained with respect to the fungus removing filtration of beer fungus during the beer production process as described above, it is not limited thereto or thereby but may be applied to the filtration any other liquid.

As described above, in the filtration apparatus according to the invention, the filter unit and the liquid washing unit for performing the liquid washing and the like and unified, and the filter elements for the main filter unit are made of sintered material containing metallic fiber with a nominal filtration rating greater than 0.3 μm but smaller than 2 μm. Therefore, it is possible to perform the smooth filtration of the beer funguses without any necessity of changing filters. It is therefore possible to operate the apparatus in an economical manner to reduce the filtration cost and save the space. It is also possible to perform the chemical washing and the heat sterilization. Furthermore, it is possible to simultaneously perform the filtration and washing of the filter.

What is claimed is:

1. A beer filtrating apparatus comprising:

a main filter means having at least one filter element made of sintered filter material containing metallic fibers for filtrating beer;

a buffer tank means connected to said main filter means for temporarily reserving therein a predetermined amount of fluid for flashing or reverse-washing said main filter means, thereby eliminating clogging of said main filter means for recycle use; and a subfilter means connected to said main filter means and to said buffer tank means and having another filter element for filtrating a washing fluid supplied to said main filter means;

wherein a nominal filtration rating of said filter element containing the metallic fiber, provided in said main filter means is greater than 0.3 μm but smaller than 2.0 μm.

2. The apparatus according to claim 1, wherein said nominal filtration rating of said filter element containing the metallic fiber, provided in said main filter means is in the range of 0.6 to 1.5 μm.

3. The apparatus according to claim 1, wherein the metallic fiber contained in said filter element provided in said main filter means has a diameter of 2 to 20 μm, an aspect ratio of 3 to 50, and a porosity rate of 30 to 55%.

4. The apparatus according to claim 1, wherein said metallic fiber is made of at least one selected from the group essentially consisting of stainless steel, inconel and hastelloy.

5. The apparatus according to claim 1, wherein said filter element is in the form of a bottomed cylinder, and a thickness of the filter element is in the range of 1 to 3 mm.

6. The apparatus according to claim 1, wherein said filter element further contains metallic fine powder, a mixture ratio between said metallic fiber and the metalic fine powder is in the range of 4:1 to 1:4.

7. The apparatus according to claim 6, wherein said metallic fine powder is made of at least one kind of metallic atomized powder selected from the group essentially consisting of stainless steel, inconel and hastelloy.

8. The apparatus according to claim 1, wherein said main filter means includes at least two main filters arranged in parallel, said apparatus further comprising a switching means for piping systems for washing one main filter during a period of filtration of beer through the other main filter.

9. The apparatus according to claim 1, wherein said main filter means, said subfilter means and said buffer tank are connected to each other, for flowing the beer to said main filter means to thereby discharge the filtrated liquid, for temporarily reserving the washing fluid in said buffer tank to flash the main filter means by the temporarily reserved washing fluid to eliminate the clogging of said main filter means for recyclic use, and for temporarily reserving the washing fluid in said buffer tank to continuously circulate the temporarily reserved fluid between said buffer tank and said main filter means for washing.

10. A beer filtrating apparatus comprising:

a main filter means having at least one filter element made of sintered filter material containing metallic fibers for filtrating beer;

a subfilter means connected to said main filter means and having another filter member for filtrating washing fluid supplied to said main filter means; and a buffer tank means connected to said main filter means and said subfilter means for temporarily reserving therein a predetermined amount of fluid for flashing or reverse-washing said main filter means and said subfilter means, thereby eliminating clogging of said main filter means and said subfilter means for recycle use; wherein nominal filtration rating of said filter elements containing the metallic fiber, provided in said main filter means and said subfilter means are greater than 0.3 μm but smaller than 2.0 μm, respectively.

11. The apparatus according to claim 10, wherein said main filter means, said subfilter means and said buffer tank are connected to each other, for flowing the beer to said main filter means to thereby discharge the filtrated liquid, for temporarily reserving the washing fluid in said buffer tank to flash said main filter means and said subfilter means by the temporarily reserved washing fluid to eliminate the clogging of said main filter means and said subfilter means for recyclic use, and for temporarily reserving the washing fluid in said buffer tank to continuously circulate the temporarily reserved fluid between said buffer tank and said main filter means for washing.

* * * * *